United States Patent
Liao et al.

(10) Patent No.: US 10,308,749 B2
(45) Date of Patent: Jun. 4, 2019

(54) PROCESS FOR PRODUCING MODIFIED THERMOSETTING POLYPHENYLENE ETHER RESIN

(71) Applicant: NAN YA PLASTICS CORPORATION, Taipei (TW)

(72) Inventors: Te-Chao Liao, Taipei (TW); Ying-Te Huang, Taipei (TW); Hao-Sheng Chen, Taipei (TW); Hung-Yi Chang, Taipei (TW); Chuan Chou, Taipei (TW); Jui-Jung Lin Lai, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 126 days.

(21) Appl. No.: 15/673,798

(22) Filed: Aug. 10, 2017

(65) Prior Publication Data
US 2018/0051116 A1  Feb. 22, 2018

(30) Foreign Application Priority Data

Aug. 17, 2016 (TW) .............................. 105126179 A

(51) Int. Cl.
| | |
|---|---|
| *C08F 283/08* | (2006.01) |
| *C08F 6/06* | (2006.01) |
| *C08F 8/02* | (2006.01) |
| *C08L 65/02* | (2006.01) |

(52) U.S. Cl.
CPC .............. *C08F 283/08* (2013.01); *C08F 6/06* (2013.01); *C08F 8/02* (2013.01); *C08L 65/02* (2013.01)

(58) Field of Classification Search
CPC .. C08F 6/06; C08F 8/02; C08F 283/08; C08L 65/02
See application file for complete search history.

(56) References Cited

U.S. PATENT DOCUMENTS

| | | | |
|---|---|---|---|
| 2015/0218326 A1* | 8/2015 | Kitai .................... | H05K 1/0326 428/209 |
| 2016/0145370 A1* | 5/2016 | Kitai .......................... | C08J 5/24 428/196 |
| 2016/0168378 A1* | 6/2016 | Umehara ............. | C08G 65/485 174/258 |

* cited by examiner

*Primary Examiner* — Robert S Jones
(74) *Attorney, Agent, or Firm* — Li & Cai Intellectual Property (USA) Office

(57) ABSTRACT

A process for producing a modified polyphenylene ether resin having a purity of more than 99.4%, comprising steps of graft modification, water rinse, and extraction as well as phase splitting, is disclosed that step of separating out powder during purification is no needed, and the solvent for use in performing dissolving of or/and extraction of polyphenylene ether resin can be recycled for future use, so that the manufacturing process is simple and uses less solvent as compared to the prior art, and further helps to conserve resources and is environmentally friendly.

9 Claims, 6 Drawing Sheets

PROCESS FOR PRODUCING MODIFIED THERMOSETTING POLYPHENYLENE ETHER RESIN

BACKGROUND OF THE INVENTION

1. Field of the Invention

The present invention relates to a process for producing thermosetting polyphenylene ether resin, and more particularly, to a simple process for producing thermosetting polyphenylene ether resin with high purity in an environmentally-friendly manner as well as energy saving manner through eliminating a manufacturing step of separating out powder and reducing amount of solvent used.

2. Description of Related Art

Polyphenylene ether resins have excellent insulativity, acid and alkali resistance, as well as good dielectric constant and dielectric loss, and thus process better electrical properties as compared to epoxy resins, making them a more suitable insulating material for high-frequency printed circuit boards.

However, most existing polyphenylene ether resins commercially available are not crosslinkable, poor in heat resistance, and not readily applicable to circuit boards. Besides, manufacturing of existing polyphenylene ether resins uses a large quantity of solvents that bring about problems related to recycling of waste solvents, and needs a great amount of recycling costs because it consumes considerable energy. Hence, there have been many researches and developments aimed at addressing the aforementioned shortcomings with the hope to make a modified polyphenylene ether resin that has curable functional groups through a method that is safe and uses a relatively small amount of solvents, while remaining the excellent electrical properties of the resulting polyphenylene ether resin.

As to known manufacturing methods of polyphenylene ether resins, U.S. Pat. No. 7,282,554 teaches polymerizing 2,6-dimethylphenol and oxygen-containing gas in the presence of a metal ion catalyst and suitable amines to as to obtain a low molecular weight polyphenylene ether, so as to improve solubility. However, this synthesis method involves using oxygen supply, which is responsible for explosion in some industrial incidents. Besides, the metal ion catalyst and amines added for synthesis are likely to remain after reaction, and have negative impacts on the cured resin and its heat resistance.

U.S. Pat. No. 5,880,221 teaches using monophenol and biphenol monomers to adjust the molecular weight of a polyphenylene ether resin in terms of size and distribution, thereby improving solubility and processability. Then the synthetic product is obtained by precipitating with ten fold methanol, washing, filtering, and drying. This known scheme uses a large quantity of methanol in the stage of purification. The use of solvents is huge and complicated.

U.S. Pat. No. 7,858,726 turns a polyphenylene ether resin of large molecular weight into a polyphenylene ether resin of small molecular weight by redistributing molecular weight, and uses water and alkali liquor to wash the resin after redistribution. In the prior-art patent, the molecular chain is terminated by a hydroxyl group. While it can be cured with an epoxy resin, the polar group remains in the polyphenylene ether resin can still cause increased dielectric constant and dielectric loss. For purification, water and alkali liquor are used for washing. While some water-soluble substances can be washed out, this method is unable to remove reactive monomers and by-products that are not soluble in water.

More particularly, U.S. Pat. No. 5,880,221 and U.S. Pat. No. 7,858,726 use biphenol or monophenol monomers to redistribute polyphenylene ether resins, so as to obtain thermosetting polyphenylene ether resins having terminal hydroxyl groups. Where a hydroxyl group is used as the active group for curing, polar groups are generated during curing. Therefore, when applied to circuit boards, such a resin is unfavorable to the cured substrate in terms of dielectric constant and dielectric loss, as well as water absorption. In the traditional manufacturing method of polyphenylene ether, purification is typically performed using anti-solvents, so the consumption of solvents is considerable (equal to several times of the reactive solution). The solvent recycling system is thus energy-consuming and not environmentally friendly.

U.S. Pat. No. 6,352,782 discloses a structure where the terminal group of a polyphenylene ether resin is covered by other unsaturated groups. Nevertheless, it is a structure with single-side functional groups, and can leads to problems about under-cure when used in circuit boards and about difficulties in preparing its prepreg resin composition. Besides, this known scheme uses a large quantity of methanol for purification, and the huge use of solvents requires increased recycling costs.

In addition, one thing characterizes polyphenylene ether resins with hydroxyl groups is the possibility of functional graft where their terminal hydroxyl groups are transformed into non-polar groups (such as unsaturated alkenyl groups or alkynyl groups) through grafting before the resins are cured, so as to decrease electric properties. However, the conventional processes use modifiers to modify terminal hydroxyl groups into unsaturated functional groups. During modification, a certain amount of impurities and by-products are generated due to by-reactions, and need to be removed by means of purification. For performing purification, it is typical that a large quantity of alcohol is used as an anti-solvent that separates the modified polyphenylene ether resin from the solvent solution into powder. Meanwhile, the impurities and by-products dissolved in the mixed solution of the anti-solvent and the solvent are separated from the modified polyphenylene ether resin through solid-liquid separation approaches such as filtering and centrifuging.

After separation, the modified polyphenylene ether resin powder has to be washed using alcohol for several times and the filtered to remove impurities and by-products attached to the surface of powder particles. The modified polyphenylene ether resin having good purity can then be obtained after drying. In the foregoing processes, the used solvents and anti-solvents both need to be purified for recycling through repeated distillation, air stripping, and extraction. In particular, azeotropy can be seen because the solvents used are typically toluene and butanone (MEK), and the anti-solvents are typically methanol and ethanol. For preventing azeotropy and making purification more efficient, there are additional demands on energy and equipment, so the entire processes are costly and energy-consuming. Furthermore, when used, the modified polyphenylene ether resins in the form of powder have to be dissolved in toluene or butanone, making the procedure of solvent recycling a total waste.

SUMMARY OF THE INVENTION

For addressing the foregoing problems, one objective of the present invention is to provide a modified thermosetting polyphenylene ether resin, which has a non-polar unsaturated active group at the terminal of its main chain, and provides excellent electric properties and heat resistance after cured. Alternatively, in addition to the terminal, unsaturated, active group, the main chain of the polyphenylene ether resin further has a side-chain reactive active group, so as to form a two-dimensional structure after cured, thereby not only increasing the resin's crosslink density and heat resistance, but also even improving the resin's electric properties. Particularly, since there is no polar group at the terminal of the main chain of the modified polyphenylene ether resin, the resin's dielectric constant and dielectric loss are significantly reduced, and its water absorption can also be greatly decreased.

Another objective of the present invention is to provide a modified thermosetting polyphenylene ether resin, which has a non-polar unsaturated active group at the terminal of its main chain to be cures, and the main-chain terminal has a number of hydroxyl groups smaller than 0.1.

Yet another objective of the present invention is to provide a process for producing thermosetting polyphenylene ether resin, which reduces the use of solvents by eliminating the need of separating out powder, and endows the resulting thermosetting polyphenylene ether resin with a purity of more than 99.4%. The process for producing thermosetting polyphenylene ether resin comprises four stages:
1) in the presence of a solvent suitable for graft-modification (hereinafter referred to as a good solvent), such as toluene or butanone, performing graft-modification on a hydroxyl group of a polyphenylene ether resin using an alkali metal compound, so as to form terminal phenoxide;
2) performing water rinse to obtain a semi-finished product of the modified polyphenylene ether resin;
3) adding extraction liquid for extraction (hereinafter referred to as a poor solvent), such as ethanol or water, which forms a molar fraction with the existing good solvent as shown in the toluene-methanol-water or toluene-ethanol-water ternary phase diagram, performing extraction in the two phase liquid-liquid region, and performing phase splitting to obtain the modified polyphenylene ether resin solution in a purified state; and
4) drying the resin solution to obtain a final product of the modified polyphenylene ether resin having a purity of more than 99.4%.

The manufacturing method of the thermosetting polyphenylene ether resin comprising the following specific steps:
1) Graft reaction: dissolving a polyphenylene ether resin in a good solvent, heating to 65-85° C.; adding tetrabutylammonium bromide (TBAB) as a phase transfer catalyst after the resin is completely dissolved; adding an aqueous solution of sodium hydroxide (NaOH) for reaction where the resin's terminal phenolic group is sodium salinized; dropwise adding 4-chloromethanestyrene monomer after 1 hour; and setting the solution aside for reaction for 9-12 hours, so as to obtain a grafted thermosetting polyphenylene ether resin solution;
2) Water rinse: holding the thermosetting polyphenylene ether resin solution of Step 1) at 50-75° C.; slowing pouring purified water in while stirring; stirring for 1 more hour and setting aside for phase splitting; removing the lower liquid and collecting the upper semi-finished product;
3) Extraction and Phase splitting: adding and mixing an alcohol and water into the upper semi-finished product reactive liquid (including the good solvent) to form an extraction liquid; calculating the molar fractions of the good solvent, the alcohol, and water to make sure the congruent point is within the two phase liquid-liquid region of the good solvent-alcohol-water ternary phase diagram (as provided in software databases or journals); performing extraction while stirring at 65° C.; setting the solution aside for phase splitting; and removing the aqueous layer to further obtain a post-extraction semi-finished product of the thermosetting polyphenylene ether resin solution;
4) recycling the removed aqueous layer of the extraction liquid solution through simple distillation; adding it back to the reactive liquid for the second extraction; setting the solution aside for phase splitting so as to obtain a final product of the polyphenylene ether resin of high purity.

The disclosed manufacturing method of the thermosetting polyphenylene ether resin uses two-phase extraction for purification, and achieves natural phase splitting on principle of phase equilibrium, so the use of solvent is minimized and solvent recycling is simple, making the manufacturing method environmentally friendly and helpful to conserve resources. The resulting thermosetting polyphenylene ether resin has a purity of more than 99.4%, and has a chlorine content below 700 ppm and a metal content below 20 ppm.

DETAILED DESCRIPTION OF THE INVENTION

Figure 1:
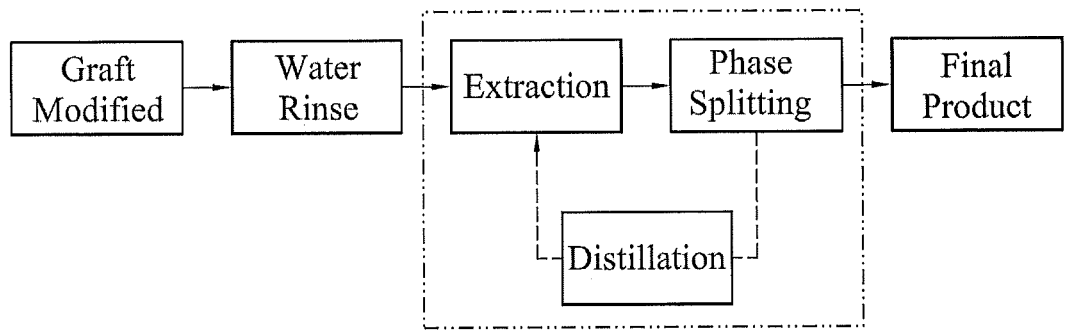
FIG. 1 is a flow chart regarding a process for producing thermosetting polyphenylene ether resin with high purity in an environmentally-friendly as well as energy saving manner.

As shown in FIG. 1, according to the present invention, a thermosetting polyphenylene ether resin is synthesized, through three stages including stage (I) of Graft Modification, stage (II) of Water Rinse, and stage (III) of Extraction and Phase Splitting, to obtain a final product of a modified thermosetting polyphenylene ether resin.

These stage (I), stage (II) and stage (III) are detailed illustration as follows:

Stage (I) of Graft Modification:

A polyphenylene ether resin having a hydroxyl group is selected, for example, from commercially available products of which needs no rectification or pre-processing in advance, such as a polyphenylene ether resin having either a chemical structure formula of (A1) or a chemical structure formula of (B1); or such as a redistributed polyphenylene ether resin being subjected to a molecular weight redistribution reaction has a chemical structure formula of (C1).

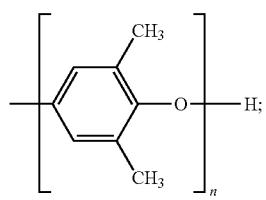
(A1)

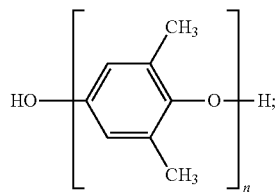
(B1)

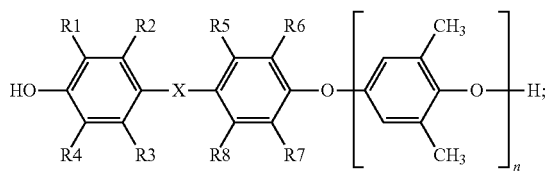
(C1)

where, R1-R8 each are one or more of allyl, H and C1-C6 alkyl;

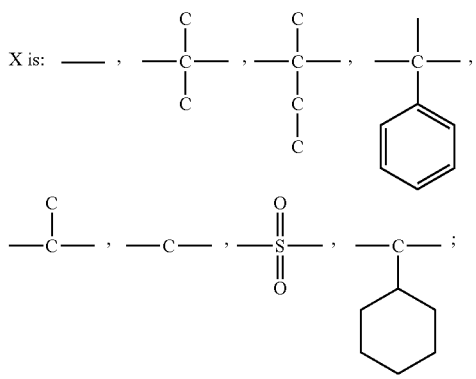

$n = 10$-$150$.

Then a chemical reaction is made to graft the hydroxyl group of the polyphenylene ether resin with an active, unsaturated functional group for crosslink curing. The mechanism of the graft reaction is on principle of nucleophilic substitution. In particular, for grafting, a potassium-salt conversion reaction or a sodium-salt conversion reaction is performed between the hydroxyl group of the polyphenylene ether resin and an alkali metal compound to form terminal phenoxide.

Terminal phenoxide is highly reactive to monomers such as halides, acid halides, and anhydrides. The graft modification reaction of the present invention is performed by adding an acid monomer such as a halide, an acid halide, or an anhydride that has an unsaturated, active group (such as an alkenyl or alkynyl group) as a graft monomer in the presence of a phase transfer catalyst. After the graft modification reaction, the residue of the foregoing monomer links oxygen atoms of the polyphenylene ether main-chain terminal form a modified thermosetting polyphenylene ether resin of the present invention. The graft modification reaction is performed at 50-120° C., preferably 60-90° C.

The graft monomer is one or more of halides, acid halides, and anhydrides having an unsaturated, active group. Practical graft monomer is one or more selected from the group consisting of 4-chloromethane styrene, 3-chloromethane styrene, acryloyl chloride, 3-bromo-1-propyne, 3-chloro-1-propyne, 3-chloro-propene, 3-bromo-propene, chloromethyl-benzene, 1-chloromethyl naphthalene, benzoyl chloride, naphthalene chloride, 4-ethynyl-benzoyl chloride, 4-ethynyl-benzoyl bromide, 4-ethynyl-2-fluoro-benzoyl chloride, 4-vinylbenzoyl chloride, benzoic anhydride and methacrylic anhydride.

The alkali metal compound used to form terminal phenoxide is an aqueous solution containing alkali metal ion, and preferably is one or more selected from the group consisting of sodium hydroxide aqueous solution, potassium hydroxide aqueous solution, sodium carbonate aqueous solution and potassium carbonate aqueous solution, for turning the terminal hydroxyl group of the polyphenylene ether resin into alkali metal phenoxide.

The adding amount of the alkali metal compound is 1-2.5 times, preferably 1.05-1.8 times, and more preferably 1.1-1.6 times of the equivalent amount of the polyphenylene ether resin.

The phase transfer catalyst is one or more selected from the group consisting of tetraethylammonium bromide (TEAB), tetrabutylammonium bromide (TBAB), hexadecyl trimethyl ammonium bromide (HTAB) and tetrabutylammonium hydrogen sulfate (TBAHS).

The adding amount of the phase transfer catalyst is 0.5%-5%, preferably 0.8%-1.4%, and more preferably 0.9%-1.2% by weight of the polyphenylene ether resin.

The good solvent suitable for graft modification of a polyphenylene ether resin having a hydroxyl group is one or more selected from toluene solvent, xylene solvent, methyl isobutyl ketone (MIBK) solvent or butanone (MEK) solvent, preferably toluene solvent or butanone solvent.

The solid content of the graft reaction solution is 10%-50%, preferably 25%-40%, based on the weight of the graft reaction solution.

For measuring the molecular weight, a fixed amount of the polyphenylene ether resin is first dissolved in tetrahydrofuran (THF) solvent to prepare a solution containing 1% of the polyphenylene ether resin. The solution is heated to 50° C. and then settled, subsequently an analysis is made using GPC (Gel Permeation Chromatography) and then a characteristic peak area is calculated. Before the analysis, a calibration curve of the molecular weights and the characteristic peak area has to be established. For polystyrene standards having different molecular weights, multi-point calibration is performed to establish the calibration curve, and then the molecular weight of the object to be measured can be obtained. Purity measurement is performed using GPC to analyze the characteristic peak ratio of the polyphenylene ether resin and impurities.

After graft modification is performed, a modified thermosetting polyphenylene ether resin of the present invention is disclosed to have a chemical structure formula of (A2) or (B2) or (C2) as followed, whose number average molecular weight (Mn) is ranged from 1,000 to 100,000, and OH value is ranged from 0.561-112.2.

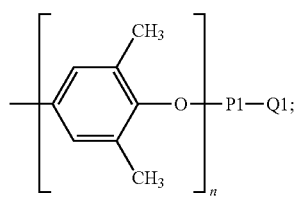
(A2)

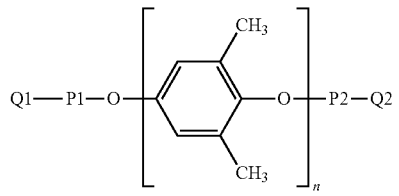
(B2)

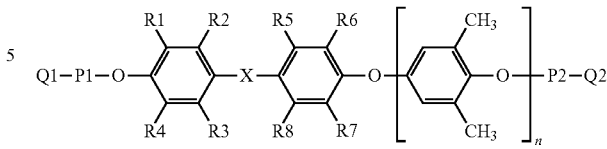
(C2)

where, R1-R8 each are one or more of allyl, H and C1-C6 alkyl;

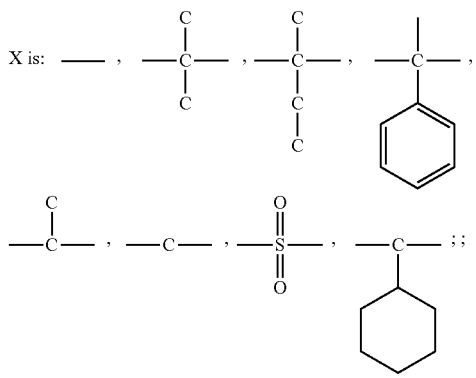

P1, P2 is ——, or CH2

Q1, Q2 is styryl, phenylethynyl, ethynyl, vinyl, methyl vinyl, benzene ring, naphthalene ring or H;
n=10-150.

Stage (II) of Water Rinse:

Neutralization is performed on the modified thermosetting polyphenylene ether resin having a chemical structure formula of (A2) or (B2) or (C2). Purified water is used for two-phase cleaning to remove metal ions remained after reaction and obtain a semi-finished product of the modified polyphenylene ether resin.

The purified water used for water rinse is 0.5-2 times of the total weight of the reactive solution, at a temperature of 30-90° C.; preferably of 50-75° C.

Stage (III) Extraction and Phase Splitting:

Based on the use amount of the good solvent in the polyphenylene ether resin solution, a certain proportion of a poor solvent is added as extraction liquid, and mixed with the good solvent to form extraction liquid for extraction. At a proper temperature and with stirring, those impurities, by-products, unreacted monomers and ionic compounds generated in the reactive liquid due to graft reaction can be effectively brought into the extraction liquid phase through mass transfer by means of stirring. By removal of those impurities, by-products and unreacted monomers from the extraction liquid, the purity of the reactive liquid is therefore enhance.

The extraction liquid does not dissolve the modified polyphenylene ether resin, but dissolves these impurities, by-products, unreacted monomers, and ionic compounds.

As described above, the good solvent is one or more selected from toluene, xylene, methyl isobutyl ketone (MIBK) or butanone (MEK) solvent.

The poor solvent (i.e., alcohol solvent) is one or more selected from water, methanol, ethanol, propyl alcohol or butyl alcohol, and preferably is water, methanol or ethanol.

Extraction refers to with a specific proportion and at specific temperature and pressure, adjusting the molar fractions (such as X1, X2, X3, . . . Xn, and so on) or weight fractions (such as W1, W2, W3, . . . Wn, and so on) of the extraction liquid phase composed of the poor solvent (such as water, methanol or ethanol) with respect to the good solvent (such as toluene or butanone) in the polyphenylene ether resin solution. Particularly, the composition of the extraction liquid is composed of three-component liquid mixtures, whose solubility of each corresponding component for the three-component liquid mixtures is conveniently displayed on applicable liquid-liquid phase equilibria (LLE) on triangular phase diagrams.

When the composition of the extraction liquid is composed of two poor solvents mixed with one good solvent, and is expressed as molar fractions or weight fractions, the composition of the good solvent always fall within a two-phase liquid-liquid region liquid-liquid phase equilibria (LLE) on triangular phase diagrams, it means that the presence of a third liquid component (i.e., good solvent) can be very useful in changing the mutual solubility of two other components of poor solvents.

Figure 2:
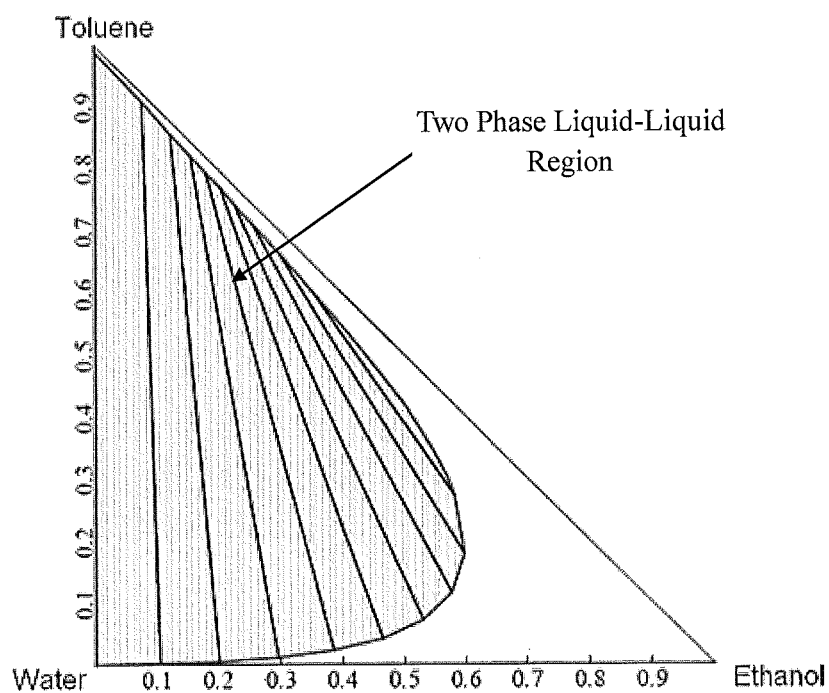
FIG. 2 is a water-ethanol-toluene ternary phase diagram available from Aspen Software Database, measured at 65° C. and 1 atmosphere, unit by molar fraction.
Figure 3:
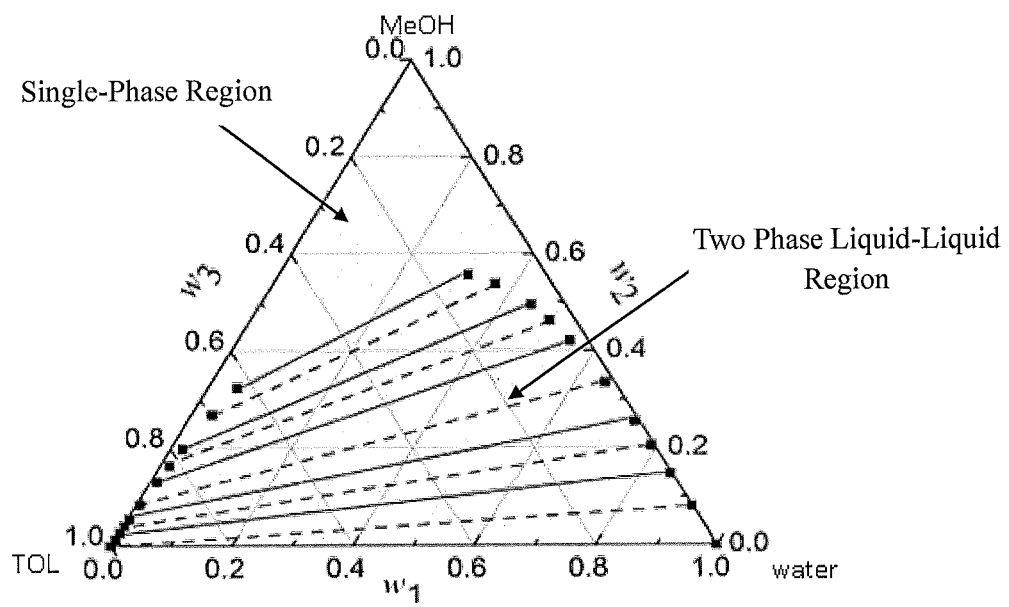
FIG. 3 is a water-methanol-toluene ternary phase diagram available from Journal of Chemical Engineering Data, measured at 50° C. and 1 atmosphere, unit by weight fraction.

For instance, FIG. 2 is a water-ethanol-toluene ternary phase diagram available from Aspen Software Database (measured at 65° C. and 1 atmosphere), and FIG. 3 is a water-methanol-toluene ternary phase diagram available from Journal of Chemical Engineering Data (measured at 50° C. and 1 atmosphere). Accordingly, in the following description, everywhere a water-ethanol-toluene ternary phase diagram or a water-methanol-toluene ternary phase diagram is referred, it represents that a ternary phase diagram associated to specific temperature and pressure measured (such as measured at 25-75° C. and 1-3 atmosphere) is available from Aspen Software Database or from Journal of Chemical Engineering Data, respectively.

According to the temperature and pressure for extraction, the location of each composition at the temperature and pressure in the ternary phase diagram can be identified. The location must fall in the two phase liquid-liquid region of the ternary phase diagram.

The composition of the extraction liquid is composed of two poor solvents of alcohol and water, and one good solvent, when expressed in molar fraction such as Xalcohol, Xwater and Xsolvent, each molar fraction of alcohol, water and the good solvent can be calculated using Equations 1-3 below:

$$X_{alcohol} = \frac{M_{alcohol}/Mw_{alcohol}}{M_{alcohol}/Mw_{alcohol} + M_{water}/Mw_{water} + M_{solvent}/Mw_{solvent}};$$ Equation 1

$$X_{water} = \frac{M_{water}/Mw_{water}}{M_{alcohol}/Mw_{alcohol} + M_{water}/Mw_{water} + M_{solvent}/Mw_{solvent}};$$ Equation 2

$$X_{solvent} = \frac{M_{solvent}/Mw_{solvent}}{M_{alcohol}/Mw_{alcohol} + M_{water}/Mw_{water} + M_{solvent}/Mw_{solvent}}.$$ Equation 3

In Equations 1-3, Xalcohol represents for the molar fraction of the alcohol, Xwater represents for the molar fraction of water, and Xsolvent represents for the molar fraction of good solvent for the polyphenylene ether resin. Therein, Xalcohol, Xwater, and Xsolvent added in total is satisfied the requirement of the following Equations 4.

$$X\text{alcohol} + X\text{water} + X\text{solvent} = 1.$$ Equation 4

Likewise, when expressed in weight fractions such as Walcohol, Wwater and Wsolvent, each weight fraction of ethanol, water, and the good solvent can be calculated using Equations 5-7 below:

$$W_{alcohol} = \frac{M_{alcohol}}{M_{alcohol} + M_{water} + M_{solvent}};$$ Equation 5

$$W_{water} = \frac{M_{water}}{M_{alcohol} + M_{water} + M_{solvent}};$$ Equation 6

$$W_{solvent} = \frac{M_{solvent}}{M_{alcohol} + M_{water} + M_{solvent}}.$$ Equation 7

In Equations 5-7, Walcohol represents for the weight fraction of the alcohol, Wwater represents for the weight fraction of water, and Wsolvent represents for the weight fraction of good solvent for the polyphenylene ether resin. Therein, Walcohol, Wwater, and Wsolvent added in total is satisfied the requirement of the following Equations 8.

$$W\text{alcohol} + W\text{water} + W\text{solvent} = 1.$$ Equation 8

For extraction, the aforesaid extraction liquid is dropwise added into the reactive liquid of the polyphenylene ether resin while stirring, so that the poor solvents mixed in the extraction liquid gets well mixed with the good solvent in the polyphenylene ether solution. At specific extraction temperature and pressure, liquid-liquid equilibrium on triangular phase diagram is established, and each composition of the extraction liquid falls within the two phase liquid-liquid region of the ternary phase diagram. For example, FIG. 2 is a ternary phase diagram of toluene, ethanol and water measured at 65° C. and 1 atmosphere, and FIG. 3 is a ternary phase diagram of toluene, methanol, and water at 50° C. and 1 atmosphere.

After the extraction liquid is dropwise added, stirring of the solution is continued while the temperature is held. Upon extraction is completed, stirring is stopped, and the solution is set aside for natural phase splitting until it splits into liquid-liquid two phases. After phase splitting, extraction is finished by removing the layer of the extraction liquid. Repeated extraction may be performed for increased purity.

For undergoing the foregoing extraction, the pressure is 1-3 atmosphere, preferably 1 atmosphere, and the temperature is 25-75° C., preferably 35-65° C. The time for extraction is ranged from 15 minutes to 300 minutes, and the time of setting aside is ranged from 10 minutes to 300 minutes. The times of undergoing the foregoing extraction may be 1-20 times.

When second extraction is required, the extraction liquid removed after phase splitting is simply distilled by heating. Then the extraction liquid recycled through condensation is added back to the original reactive liquid. Since the extraction liquid is entirely placed back into the original extraction system, the total composition of the three-component system composed of the extraction liquid and the good solvent remains unchanged, and is still within the two phase liquid-liquid region of the ternary phase diagram, so natural phase splitting is possible. After the extraction liquid is added, temperature-holding and stirring are continued. When extraction is completed, the solution is set aside for phase splitting. After phase splitting, the extraction liquid layer is removed to finish extraction.

When more times of extraction are required, the foregoing step can be repeated for increased purity. In particular, no matter how many times of extraction has been performed, the extraction liquid prepared from three-component compositions always remains the same mixing proportion to have two poor solvents mixed with one good solvent in the polyphenylene ether resin solution.

Accordingly, even if many times of extraction have been done, since the extraction liquid of the poor solvent composition is fully recycled, the total composition it forms with the good solvent in the polyphenylene ether resin solution remains unchanged, so the compositions of the components are all at the same location in the two phase liquid-liquid region of the ternary phase diagram.

The extraction liquid removed after phase splitting is simply distilled by heating, and entirely added back to the extraction system, without adding new solvent. With continuous recycling and reuse, the disclosed process for producing the modified thermosetting polyphenylene ether resin of the present invention can reduce solvent consumption, and thus is environmentally friendly and helpful to conserve energy.

More specifically, the extraction liquid removed after phase splitting can be recycled through simple distillation without frequent purification operations, so the present invention provides advantages related to low costs, low energy consumption, and environmental protection.

The final product of the modified thermosetting polyphenylene ether resin of the present invention is measured for its molecular weight, chlorinity, metal content, an OH value, to verify whether the resulting resin meets requirements or not.

The modified thermosetting polyphenylene ether resin made according to the present invention has chlorine content (hereinafter referred to as chlorinity) below 700 ppm, and metal content below 20 ppm.

The modified thermosetting polyphenylene ether resin made according to the present invention may be delivered in the form of solution for use in later formulation, or it may have the good solvent removed to form as a solid polyphenylene ether resin.

The following examples and comparative examples are described for illustrating the effects of the modified thermosetting polyphenylene ether resin made according to the present invention, and shall not form limitation to the scope of the present invention.

1. Measure of Molecular Weight of Polyphenylene Ether Resin:

A fixed amount of the polyphenylene ether resin is dissolved in THF solvent to prepare a 1% solution. The solution is heated to clear, after which analysis is made using GPC (Gel Permeation Chromatography) and the characteristic peak area is calculated. A calibration curve for analysis is established using multi-point calibration of polystyrene standards having different molecular weights. Then the molecular weight of the object to be measured can be obtained.

2. Measure of OH Value:

A pyridine solution containing 25 vol % of acetic anhydride is prepared to make an acetylation reagent. The object to be measured is weighed for several grams and heated with 5 mL of the acetylation reagent until it is fully dissolved. Phenolphthalein is added as an indicator, and 0.5N potassium hydroxide ethanol solution is used for standardization.

3. Measure of Purity:

GPC is used to analyze the characteristic peak ratio between the polyphenylene ether resin and impurities.

Example 1

(1) Graft Reaction for Modification:

250 g of a polyphenylene ether resin having a molecular weight Mn=3,530 and OH value of 65 was dissolved in 500 g of toluene. The solution was heated to 75° C. After full dissolution, 0.25 g of tetrabutylammonium bromide (TBAB) was added as a phase transfer catalyst, and 22.2 g of 45% NaOH aqueous solution was added for reaction for 1 hour, so as to realize sodium salinization of the terminal phenolic group. One hour later, 38.1 g of 4-chloromethane styrene monomer was added dropwise. One more hour later, the temperature was held at 75° C. for reaction for 10 hours, thereby obtaining a semi-finished product of the thermosetting polyphenylene ether resin solution numbered PPE-A1.

(2) Water Rinse:

The thermosetting polyphenylene ether resin solution grafted in the previous step was held at 65° C. while stirred, and 750 g of purified water is added slowly. Stirring lasted for one more hour with the rotation rate fixed at 300 rpm. After one hour, stirring was stopped, and the solution was set aside for phase splitting.

After phase splitting, the lower aqueous phase was discharged to collect a semi-finished product of PPE-A2.

(3) Extraction and Phase Splitting:

Given that toluene contained in the semi-finished product of the thermosetting polyphenylene ether resin solution PPE-A2 was 500 g. 150 g of ethanol and 15 g of water were mixed first as an extraction liquid. Based on the sum amount of the extraction liquid (ethanol and water) and toluene, the molar fractions of toluene, ethanol, and water were 0.57, 0.34, and 0.09, respectively.

Figure 4:
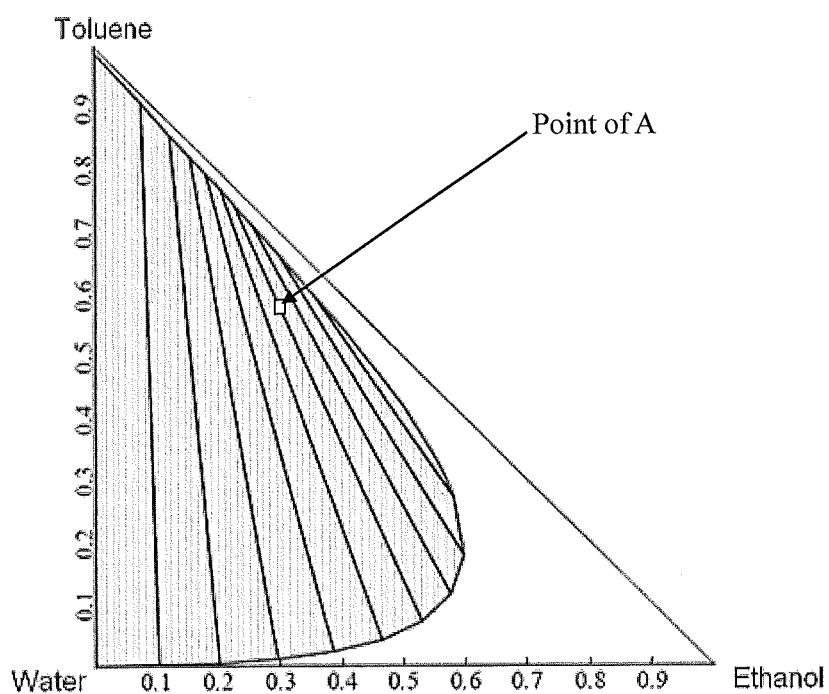
FIG. 4 is a water-ethanol-toluene ternary phase diagram available from Aspen Software Database (unit: mole %; measured at 65° C. and 1 atmosphere) for use in Example 1 to show that "Point of A" located within the two phase liquid-liquid region of the toluene-ethanol-water ternary phase diagram by according to molar fractions of toluene, ethanol, and water being 0.57, 0.34, and 0.09, respectively.

For undergoing extraction of thermosetting polyphenylene ether resin solution, a water-ethanol-toluene ternary phase diagram shown as FIG. 4 is available from Aspen Software Database (unit: mole %; measured at 65° C. and 1 atmosphere). Accordingly, a "Point of A" is found to locate within the two phase liquid-liquid region of the toluene-ethanol-water ternary phase diagram by according to those aforesaid molar fractions of toluene, ethanol and water.

The semi-finished product PPE-A2 was therefore held at 65° C. And, the beforehand prepared extraction liquid of ethanol and water was slowly dropwise added. Extraction was performed at 65° C. while stirring for 2 hr. The solution was set aside for phase splitting, and then the aqueous layer was discharged, thereby obtaining an extracted semi-finished product of the thermosetting polyphenylene ether resin solution.

To undergo a second extraction, the extraction liquid and the reactive liquid of the polyphenylene ether resin was stirred for 2 hours, and set aside for phase splitting. Then the resin phase was retained, with the extraction liquid phase removed. The removed extraction liquid solution was recycled using simple distillation recycling and later added back to the reactive liquid for the second extraction.

Since the aggregate relation among toluene, ethanol, and water remained unchanged, the second extraction still happened at Point of A in FIG. 4. The foregoing extraction step was repeated for the second extraction. After the second extraction, the polyphenylene ether resin obtained after phase splitting was numbered as PPE-A3.

The final product of PPE-A3, as measured in Table 1, has its chlorinity of 565 ppm, metal content of 12 ppm, and molecular weight of 3,860 g/mole, while its OH value was not detected. The purity of PPE-A3 is 99.4% or more.

Example 2

(1) Graft Reaction for Modification:

250 g of a polyphenylene ether resin having a molecular weight Mn=17,851 and OH value of 8.2 was dissolved in 500 g of toluene. The solution was heated to 75° C. After full dissolution, 0.25 g of tetrabutylammonium bromide (TBAB) was added as a phase transfer catalyst, and 5.6 g of 45% NaOH aqueous solution was added for reaction for 1 hour, so as to realize sodium salinization of the terminal phenolic group. One hour later, 9.6 g of 4-chloromethane styrene monomer was added dropwise. One more hour later, the temperature was held at 75° C. for reaction for 12 more hours, thereby obtaining a semi-finished product of the thermosetting polyphenylene ether resin solution numbered PPE-B1.

(2) Water Rinse:

The thermosetting polyphenylene ether resin solution grafted in the previous step was held at 65° C. while stirred, and 750 g of purified water is added slowly. Stirring lasted for one more hour with the rotation rate fixed at 300 rpm. After one hour, stirring was stopped, and the solution was set aside for phase splitting.

After phase splitting, the lower aqueous phase was discharged to collect a semi-finished product of PPE-B2.

(3) Extraction and Phase Splitting:

Given that toluene contained in the semi-finished product of the thermosetting polyphenylene ether resin solution PPE-B2 was 500 g. 200 g of ethanol and 20 g of water were mixed first as an extraction liquid. Based on the sum amount of the extraction liquid (ethanol and water) and toluene, the molar fractions of toluene, ethanol, and water were 0.50-0.40 and 0.10, respectively.

Figure 5:
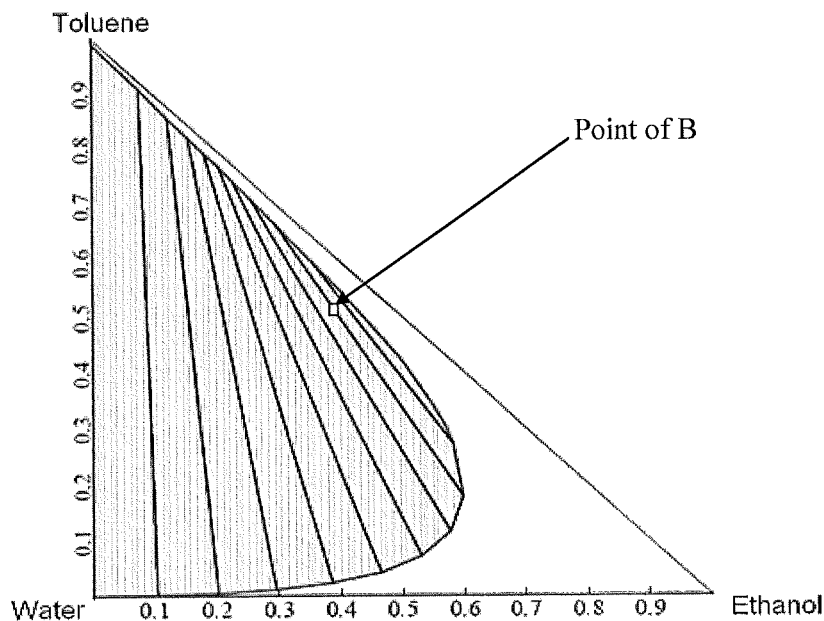
FIG. 5 is a water-ethanol-toluene ternary phase diagram available from Aspen Software Database (unit: mole %; measured at 65° C. and 1 atmosphere) for use in Example 2 to show that "Point of B" located within the two phase liquid-liquid region of the toluene-ethanol-water ternary phase diagram by according to molar fractions of toluene, ethanol, and water being 0.50、0.40、0.10, respectively.

For undergoing extraction of thermosetting polyphenylene ether resin solution, a water-ethanol-toluene ternary phase diagram shown as FIG. 5 is available from Aspen Software Database (unit: mole %; measured at 65° C. and 1 atmosphere). Accordingly, a "Point of B" is found to locate within the two phase liquid-liquid region of the toluene-ethanol-water ternary phase diagram by according to those aforesaid molar fractions of toluene, ethanol and water.

The semi-finished product PPE-B2 was therefore held at 65° C. And, the beforehand prepared extraction liquid of ethanol and water was slowly dropwise added. Extraction was performed at 65° C. while stirring for 2 hr. The solution was set aside for phase splitting, and then the aqueous layer was discharged, thereby obtaining an extracted semi-finished product of the thermosetting polyphenylene ether resin solution.

To undergo a second extraction, the extraction liquid and the reactive liquid of the polyphenylene ether resin was stirred for 2 hours, and set aside for phase splitting. Then the resin phase was retained, with the extraction liquid phase removed. The removed extraction liquid solution was recycled using simple distillation recycling and later added back to the reactive liquid for the second extraction.

Since the aggregate relation among toluene, ethanol, and water remained unchanged, the second extraction still happened at Point of B in FIG. 5. The foregoing extraction step was repeated for the second extraction. After the second extraction, the polyphenylene ether resin obtained after phase splitting was numbered as PPE-B3.

The final product of PPE-B3, as measured in Table 1, has its chlorinity of 652 ppm, metal content of 15 ppm, molecular weight of 18,983 g/mole, and OH value of 0.01. The purity of PPE-B3 is 99.5% or more.

Example 3

(1) Graft Reaction for Modification:

250 g of a polyphenylene ether resin having a molecular weight Mn=2,276 and OH value of 72 was dissolved in 500 g of toluene. The solution was heated to 75° C. After full dissolution, 0.5 g of tetrabutylammonium bromide (TBAB) was added as a phase transfer catalyst, and 37.08 g of 45% NaOH aqueous solution was added for reaction for 1 hour, so as to realize sodium salinization of the terminal phenolic group. One hour later, 63.6 g of 4-chloromethane styrene monomer was added dropwise. The reaction was performed for 12 more hours, thereby obtaining a semi-finished product of the thermosetting polyphenylene ether resin solution numbered PPE-C1.

(2) Water Rinse:

The thermosetting polyphenylene ether resin solution grafted in the previous step was held at 65° C. while stirred, and 750 g of purified water is added slowly. Stirring lasted for one more hour with the rotation rate fixed at 300 rpm. After one hour, stirring was stopped, and the solution was set aside for phase splitting.

After phase splitting, the lower aqueous phase was discharged to collect a semi-finished product of PPE-C2.

(3) Extraction and Phase Splitting:

Given that toluene contained in the semi-finished product of the thermosetting polyphenylene ether resin solution PPE-C2 was 500 g. 250 g of ethanol and 25 g of water were mixed first as an extraction liquid. Based on the sum amount of the extraction liquid (ethanol and water) and toluene, the molar fractions of toluene, ethanol, and water were 0.44, 0.44, and 0.12, respectively.

Figure 6:
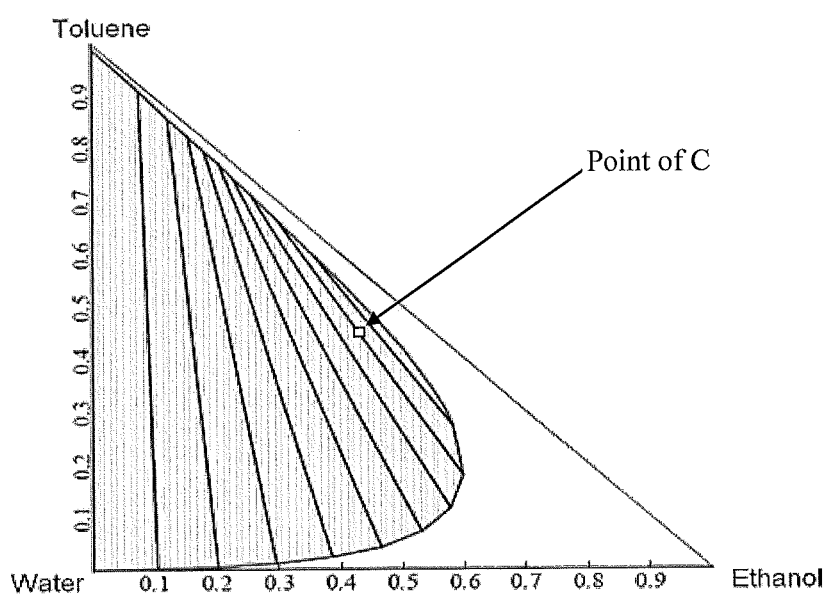
FIG. 6 is a water-ethanol-toluene ternary phase diagram available from Aspen Software Database (unit: mole %; measured at 65° C. and 1 atmosphere) for use in Example 3 to show that "Point of C" located within the two phase liquid-liquid region of the toluene-ethanol-water ternary phase diagram by according to molar fractions of toluene, ethanol, and water being 0.44, 0.44, and 0.12, respectively.

For undergoing extraction of thermosetting polyphenylene ether resin solution, a water-ethanol-toluene ternary phase diagram shown as FIG. 6 is available from Aspen Software Database (unit: mole %; measured at 65° C. and 1 atmosphere). Accordingly, a "Point of C" is found to locate within the two phase liquid-liquid region of the toluene-ethanol-water ternary phase diagram by according to those aforesaid molar fractions of toluene, ethanol and water.

The semi-finished product PPE-C2 was therefore held at 65° C. And, the beforehand prepared extraction liquid of ethanol and water was slowly dropwise added. Extraction was performed at 65° C. while stirring for 2 hr. The solution was set aside for phase splitting, and then the aqueous layer was discharged, thereby obtaining an extracted semi-finished product of the thermosetting polyphenylene ether resin solution.

To undergo a second extraction, the extraction liquid and the reactive liquid of the polyphenylene ether resin was stirred for 2 hours, and set aside for phase splitting. Then the resin phase was retained, with the extraction liquid phase removed. The removed extraction liquid solution was recycled using simple distillation recycling and later added back to the reactive liquid for the second extraction.

Since the aggregate relation among toluene, ethanol, and water remained unchanged, the second extraction still happened at Point of C in FIG. 6. The foregoing extraction step was repeated for the second extraction. After the second extraction, the polyphenylene ether resin obtained after phase splitting was numbered as PPE-C3.

The final product of PPE-C3, as measured in Table 1, has its chlorinity of 624 ppm, metal content of 12 ppm, and molecular weight of 2,675 g/mole, while its OH value was not detected. The purity of PPE-C3 is 99.5% or more.

Example 4

(1) Graft Reaction for Modification:
   250 g of a polyphenylene ether resin having a molecular weight Mn=2,276 and OH value of 72 was dissolved in 500 g of toluene. The solution was heated to 75° C. After full dissolution, 0.5 g of tetrabutylammonium bromide (TBAB) was added as a phase transfer catalyst, and 37.08 g of 45% NaOH aqueous solution was added for reaction for 1 hour, so as to realize sodium salinization of the terminal phenolic group. One hour later, 63.6 g of 4-chloromethane styrene monomer was added dropwise. The reaction was performed for 12 more hours, thereby obtaining a semi-finished product of the thermosetting polyphenylene ether resin solution numbered PPE-D1.

(2) Water Rinse:
   The thermosetting polyphenylene ether resin solution grafted in the previous step was held at 65° C. while stirred, and 750 g of purified water is added slowly. Stirring lasted for one more hour with the rotation rate fixed at 300 rpm. After one hour, stirring was stopped, and the solution was set aside for phase splitting.
   After phase splitting, the lower aqueous phase was discharged to collect a semi-finished product of PPE-D2.

Figure 7:
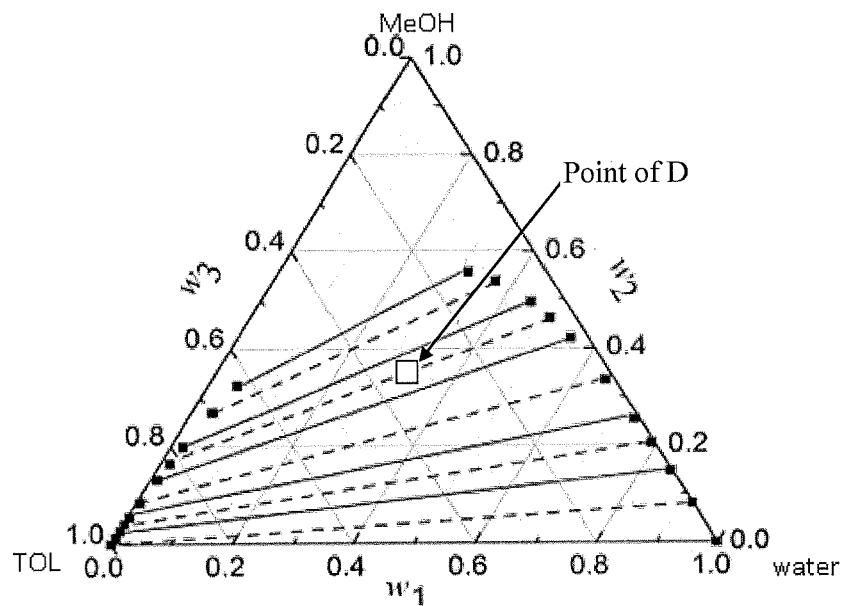
FIG. 7 is a water-methanol-toluene ternary phase diagram available from Journal of Chemical Engineering Data (reference: 2012, 57, 3309-3314; unit: wt %, measured at 50° C. and 1 atmosphere) for use in Example 4 to show that "Point of D" located within the two phase liquid-liquid region of the toluene-methanol-water ternary phase diagram by according to weight fractions of toluene, methanol, and water being 0.38, 0.31, and 0.31, respectively.

(3) Extraction and Phase Splitting:
   Given that toluene contained in the semi-finished product of the thermosetting polyphenylene ether resin solution PPE-D2 was 500 g. 400 g of methanol and 400 g of water were mixed first as an extraction liquid. Based on the sum amount of the extraction liquid (methanol and water) and toluene, the weight fractions of toluene, methanol, and water were 0.38, 0.31, and 0.31, respectively.
   For undergoing extraction of thermosetting polyphenylene ether resin solution, a water-methanol-toluene ternary phase diagram shown as FIG. 7 is available from Journal of Chemical Engineering Data (unit: wt %; measured at 50° C. and 1 atmosphere). Accordingly, a "Point of D" is found to locate within the two phase liquid-liquid region of the toluene-methanol-water ternary phase diagram by according to those aforesaid weight fractions of toluene, methanol and water.
   The semi-finished product PPE-D2 was therefore held at 50° C. And, the beforehand prepared extraction liquid of methanol and water was slowly dropwise added. Extraction was performed at 50° C. while stirring for 2 hr. The solution was set aside for phase splitting, and then the aqueous layer was discharged, thereby obtaining an extracted semi-finished product of the thermosetting polyphenylene ether resin solution.
   To undergo a second extraction, the extraction liquid and the reactive liquid of the polyphenylene ether resin was stirred for 2 hours, and set aside for phase splitting. Then the resin phase was retained, with the extraction liquid phase removed. The removed extraction liquid solution was recycled using simple distillation recycling and later added back to the reactive liquid for the second extraction.
   Since the aggregate relation among toluene, methanol, and water remained unchanged, the second extraction still happened at Point of D in FIG. 7. The foregoing extraction step was repeated until the sixth extraction was completed. The polyphenylene ether resin obtained after phase splitting was numbered as PPE-D3.

The final product of PPE-D3, as measured in Table 1, has its chlorinity of 628 ppm, metal content of 15 ppm, and molecular weight of 2,749/mole, while its OH value was not detected. The purity of PPE-D3 is 99.6% or more.

Example 5

(1) Graft Reaction for Modification:
   250 g of a polyphenylene ether resin having a molecular weight Mn=17,851 and OH value of 8.2 was dissolved in 500 g of toluene. The solution was heated to 75° C. After full dissolution, 0.5 g of tetrabutylammonium bromide (TBAB) was added as a phase transfer catalyst, and 5.6 g of 45% NaOH aqueous solution was added for reaction for 1 hour, so as to realize sodium salinization of the terminal phenolic group. One hour later, 9.6 g of 4-chloromethane styrene monomer was added dropwise. The reaction was performed for 12 more hours, thereby obtaining a semi-finished product of the thermosetting polyphenylene ether resin solution numbered PPE-E1.

(2) Water Rinse:
   The thermosetting polyphenylene ether resin solution grafted in the previous step was held at 65° C. while stirred, and 750 g of purified water is added slowly. Stirring lasted for one more hour with the rotation rate fixed at 300 rpm. After one hour, stirring was stopped, and the solution was set aside for phase splitting.
   After phase splitting, the lower aqueous phase was discharged to collect a semi-finished product of PPE-E2.

Figure 8:
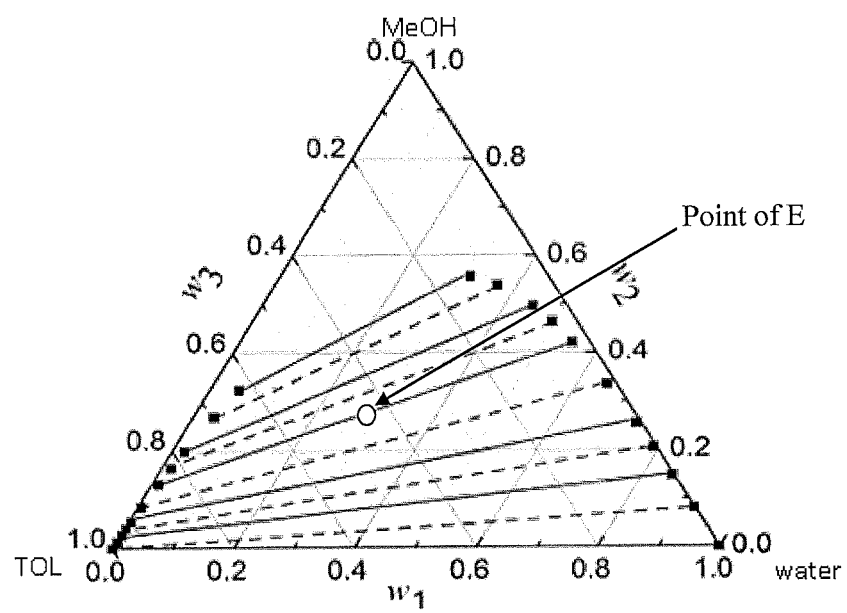
FIG. 8 is a water-methanol-toluene ternary phase diagram available from Journal of Chemical Engineering Data (reference: 2012, 57, 3309-3314; unit: wt %, measured at 50° C. and 1 atmosphere) for use in Example 5 to show that "Point of E" located within the two phase liquid-liquid region of the toluene-methanol-water ternary phase diagram by according to weight fractions of toluene, methanol, and water being 0.45, 0.275, and 0.275, respectively.

(3) Extraction and Phase Splitting:
   Given that toluene contained in the semi-finished product of the thermosetting polyphenylene ether resin solution PPE-E2 was 500 g. 300 g of methanol and 300 g of water were mixed first as an extraction liquid. Based on the sum amount of the extraction liquid (methanol and water) and toluene, the weight fractions of toluene, methanol, and water were 0.45, 0.275, and 0.275, respectively.
   For undergoing extraction of thermosetting polyphenylene ether resin solution, a water-methanol-toluene ternary phase diagram shown as FIG. 8 is available from Journal of Chemical Engineering Data (unit: wt %; measured at 50° C. and 1 atmosphere). Accordingly, a "Point of E" is found to locate within the two phase liquid-liquid region of the toluene-methanol-water ternary phase diagram by according to those aforesaid weight fractions of toluene, methanol and water.
   The semi-finished product PPE-E2 was therefore held at 50° C. And, the beforehand prepared extraction liquid of methanol and water was slowly dropwise added. Extraction was performed at 50° C. while stirring for 2 hr. The solution was set aside for phase splitting, and then the aqueous layer was discharged, thereby obtaining an extracted semi-finished product of the thermosetting polyphenylene ether resin solution.
   To undergo a second extraction, the extraction liquid and the reactive liquid of the polyphenylene ether resin was stirred for 2 hours, and set aside for phase splitting. Then the resin phase was retained, with the extraction liquid phase removed. The removed extraction liquid solution was recycled using simple distillation recycling and later added back to the reactive liquid for the second extraction.

Since the aggregate relation among toluene, methanol, and water remained unchanged, the second extraction still happened at Point of E in FIG. 8. The foregoing extraction step was repeated for the second extraction. After the second extraction, the polyphenylene ether resin obtained after phase splitting was numbered as PPE-E3.

The final product of PPE-E3, as measured in Table 1, has its chlorinity of 562 ppm, metal content of 14 ppm, molecular weight of 19,256 g/mole, and OH value of 0.01. The purity of PPE-E3 is 99.6% or more.

Example 6

Figure 9:
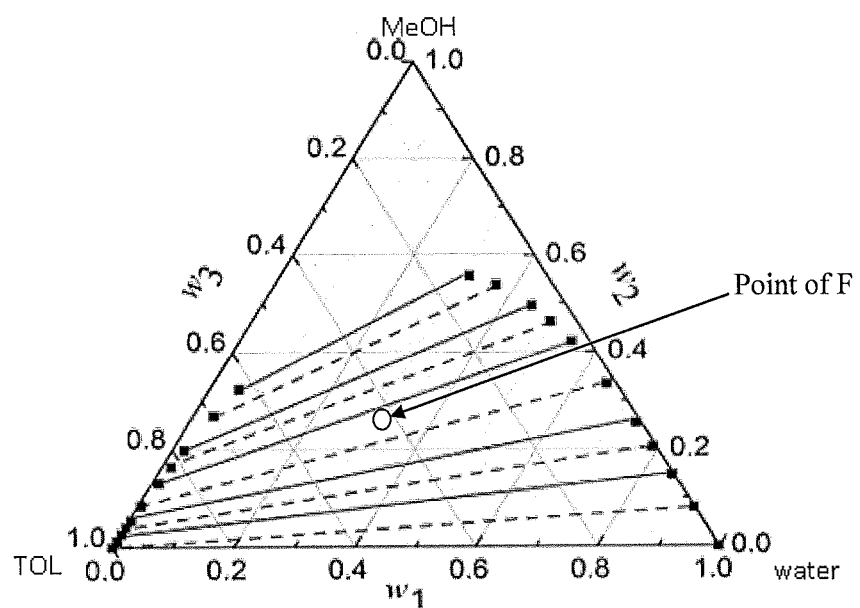
FIG. 9 is a water-methanol-toluene ternary phase diagram available from Journal of Chemical Engineering Data (reference: 2012, 57, 3309-3314; unit: wt %, measured at 50° C. and 1 atmosphere) for use in Example 6 to show that "Point of F" located within the two phase liquid-liquid region of the toluene-methanol-water ternary phase diagram by according to weight fractions of toluene, methanol, and water being 0.42, 0.25, and 0.33, respectively.

(1) Graft Reaction for Modification:
  250 g of a polyphenylene ether resin having a molecular weight Mn=15,547 and OH value of 14.8 was dissolved in 500 g of toluene. The solution was heated to 75° C. After full dissolution, 0.5 g of tetrabutylammonium bromide (TBAB) was added as a phase transfer catalyst, and 5.63 g of 45% NaOH aqueous solution was added for reaction for 1 hour, so as to realize sodium salinization of the terminal phenolic group. One hour later, 9.68 g of 4-chloromethane styrene monomer was added dropwise. The reaction was performed for 12 more hours, thereby obtaining a semi-finished product of the thermosetting polyphenylene ether resin solution numbered PPE-F1.
(2) Water Rinse:
  The thermosetting polyphenylene ether resin solution grafted in the previous step was held at 65° C. while stirred, and 750 g of purified water is added slowly. Stirring lasted for one more hour with the rotation rate fixed at 300 rpm. After one hour, stirring was stopped, and the solution was set aside for phase splitting.
  After phase splitting, the lower aqueous phase was discharged to collect a semi-finished product of PPE-F2.
(3) Extraction and Phase Splitting:
  Given that toluene contained in the semi-finished product of the thermosetting polyphenylene ether resin solution PPE-F2 was 500 g. 300 g of methanol and 400 g of water were mixed first as an extraction liquid. Based on the sum amount of the extraction liquid (methanol and water) and toluene, the weight fractions of toluene, methanol, and water were 0.42, 0.25, and 0.33, respectively.
  For undergoing extraction of thermosetting polyphenylene ether resin solution, a water-methanol-toluene ternary phase diagram shown as FIG. 9 is available from Journal of Chemical Engineering Data (unit: wt %; measured at 50° C. and 1 atmosphere). Accordingly, a "Point of F" is found to locate within the two phase liquid-liquid region of the toluene-methanol-water ternary phase diagram by according to those aforesaid weight fractions of toluene, methanol and water.
  The semi-finished product PPE-F2 was therefore held at 50° C. And, the beforehand prepared extraction liquid of methanol and water was slowly dropwise added. Extraction was performed at 50° C. while stirring for 2 hr. The solution was set aside for phase splitting, and then the aqueous layer was discharged, thereby obtaining an extracted semi-finished product of the thermosetting polyphenylene ether resin solution.
  To undergo a second extraction, the extraction liquid and the reactive liquid of the polyphenylene ether resin was stirred for 2 hours, and set aside for phase splitting. Then the resin phase was retained, with the extraction liquid phase removed. The removed extraction liquid solution was recycled using simple distillation recycling and later added back to the reactive liquid for the second extraction.
  Since the aggregate relation among toluene, methanol, and water remained unchanged, the second extraction still happened at Point of F in FIG. 9. The foregoing extraction step was repeated until the fourth extraction was completed. After the fourth extraction, the polyphenylene ether resin obtained after phase splitting was numbered as PPE-F3.

The final product PPE-F3, as measured in Table 1, has its chlorinity of 354 ppm, metal content of 8 ppm, and molecular weight of 17,780 g/mole, while its OH value was not detected. The purity of PPE-F3 is 99.9% or more.

Comparative Example 1

Figure 10:
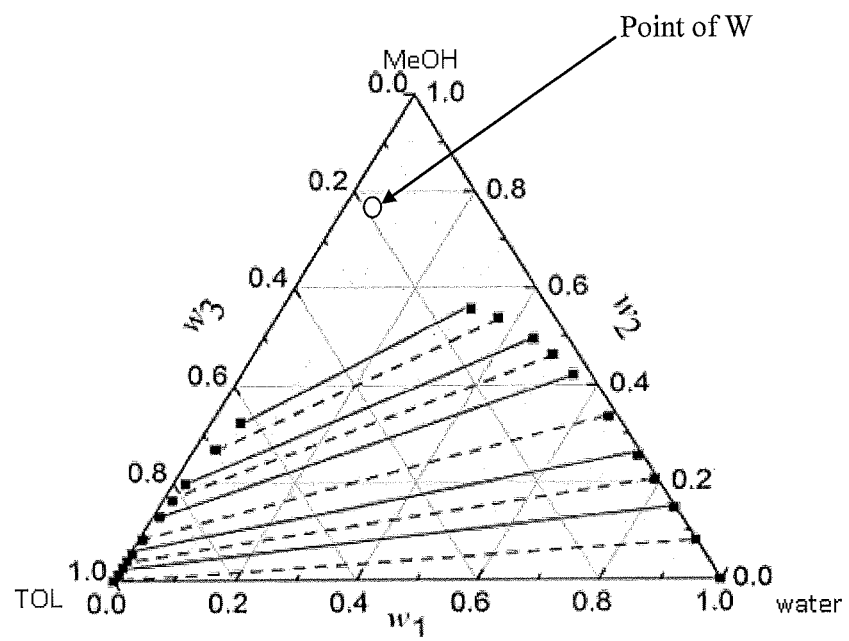
FIG. 10 is a water-methanol-toluene ternary phase diagram available from Journal of Chemical Engineering Data (reference: 2012, 57, 3309-3314; unit: wt %, measured at 50° C. and 1 atmosphere) for use in Comparative Example 1 to show that "Point of W" located outside of the two phase liquid-liquid region of the toluene-methanol-water ternary phase diagram by according to weight fractions of toluene, methanol, and water being 0.19, 0.74, and 0.07, respectively.

(1) Graft Reaction for Modification:
  250 g of a polyphenylene ether resin having a molecular weight Mn=2,276 and OH value of 72 was dissolved in 500 g of toluene. The solution was heated to 75° C. After full dissolution, 0.5 g of tetrabutylammonium bromide (TBAB) was added as a phase transfer catalyst, and 37.08 g of 45% NaOH aqueous solution was added for reaction for 1 hour, so as to realize sodium salinization of the terminal phenolic group. One hour later, 63.6 g of 4-chloromethane styrene monomer was added dropwise. The reaction was performed for 12 more hours, thereby obtaining a semi-finished product of the thermosetting polyphenylene ether resin solution numbered PPE-W1.
(2) Water Rinse:
  The thermosetting polyphenylene ether resin solution grafted in the previous step was held at 65° C. while stirred, and 750 g of purified water is added slowly. Stirring lasted for one more hour with the rotation rate fixed at 300 rpm. After one hour, stirring was stopped, and the solution was set aside for phase splitting.
  After phase splitting, the lower aqueous phase was discharged to collect a semi-finished product of PPE-W2.
(3) Purification:
  Reactive liquid of the semi-finished product PPE-W2 was added into a mixture of 2000 g of methanol, which is four times of the weight of toluene of 500 g, and 200 g of water, which is 0.4 times of the weight of toluene of 200 g. The solution was held at 50° C. and stirred fast for separation.
  Based on the sum amount of toluene, methanol, and water, the weight fractions of toluene, methanol, and water were 0.19, 0.74, and 0.07, respectively.
  A water-methanol-toluene ternary phase diagram shown as FIG. 10 is available from Journal of Chemical Engineering Data (unit: wt %; measured at 50° C. and 1 atmosphere). Accordingly, a "Point of W" is found to locate outside of the two phase liquid-liquid region, but within the single-phase region, of the toluene-methanol-water ternary phase diagram by according to those aforesaid weight fractions of toluene, methanol and water.
  Then purified water was used to wash for several times, thereby obtaining the thermosetting polyphenylene ether resin numbered PPE-W3.

The final product PPE-W3 was measured in Table 1 to have its chlorinity of 896 ppm, metal content of 83 ppm, and molecular weight of 2,753 g/mole, while its OH value was not detected. The purity of PPE-W3 is 95.9%.

Comparative Example 2

(1) Graft Reaction for Modification:

250 g of a polyphenylene ether resin having a molecular weight Mn=32,574 and OH value of 9.4 was dissolved in 500 g of toluene. The solution was heated to 75° C. After full dissolution, 0.5 g of tetrabutylammonium bromide (TBAB) was added as a phase transfer catalyst, and 5.6 g of 45% NaOH aqueous solution was added for reaction for 1 hour, so as to realize sodium salinization of the terminal phenolic group. One hour later, 9.6 g of 4-chloromethane styrene monomer was added dropwise. The reaction was performed for 12 more hours, thereby obtaining a semi-finished product of the thermosetting polyphenylene ether resin solution numbered PPE-Z1.

(2) Water Rinse:

The thermosetting polyphenylene ether resin solution grafted in the previous step was held at 65° C. while stirred, and 750 g of purified water is added slowly. Stirring lasted for one more hour with the rotation rate fixed at 300 rpm. After one hour, stirring was stopped, and the solution was set aside for phase splitting.

After phase splitting, the lower aqueous phase was discharged to collect a semi-finished product of PPE-Z2.

(3) Purification:

Reactive liquid of the semi-finished product PPE-W2 was added into a mixture of 2000 g of methanol, which is four times of the weight of toluene of 500 g, and 200 g of water, which is 0.4 times of the weight of toluene of 200 g. The solution was held at 50° C. and stirred fast for separation.

Washing was performed for several times using purified water, so as to obtain the thermosetting polyphenylene ether resin. The thermosetting polyphenylene ether resin was then filtered and backed before being dissolved in 500 g of toluene. After full dissolution, it was again added into a mixture of 2000 g of methanol, which is four times of the weight of toluene of 500 g, and 200 g of water, which is 0.4 times of the weight of toluene of 200 g. The solution was stirred was held at 50° C. and stirred fast for separation, so as to finish the second purification.

Based on the sum amount of toluene, methanol, and water, the weight fractions of toluene, methanol, and water were 0.19, 0.74, and 0.07, respectively.

Figure 11:
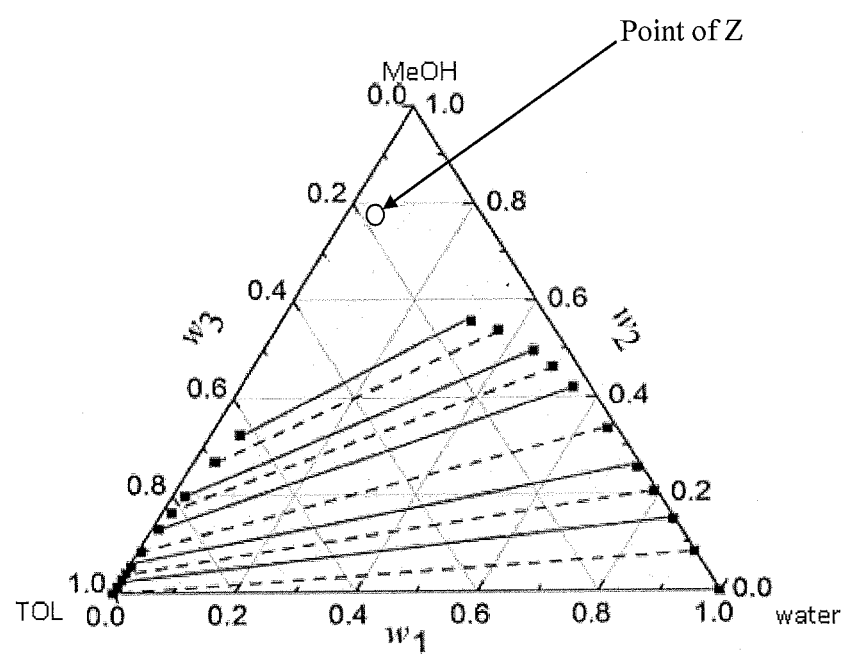
FIG. 11 is a water-methanol-toluene ternary phase diagram available from Journal of Chemical Engineering Data (reference: 2012, 57, 3309-3314; unit: wt %, measured at 50° C. and 1 atmosphere) for use in Comparative Example 2 to show that "Point of Z" located outside of the two phase liquid-liquid region of the toluene-methanol-water ternary phase diagram by according to weight fractions of toluene, methanol, and water being 0.19, 0.74, and 0.07, respectively.

A water-methanol-toluene ternary phase diagram shown as FIG. 11 is available from Journal of Chemical Engineering Data (unit: wt %; measured at 50° C. and 1 atmosphere). Accordingly, a "Point of Z" is found to locate outside of the two phase liquid-liquid region, but within the single-phase region, of the toluene-methanol-water ternary phase diagram by according to those aforesaid weight fractions of toluene, methanol and water.

Then purified water was used to wash for several times, thereby obtaining the thermosetting polyphenylene ether resin numbered PPE-Z3.

The final product PPE-Z3 was measured in Table 1 to have its chlorinity of 715 ppm, metal content of 42 ppm, and molecular weight of 19,975 g/mole, while its OH value was not detected. The purity of PPE-W3 is 97.2%.

TABLE 1 properties of polyphenylene ether

| | | Example | | | | | | Comparative Example | |
|---|---|---|---|---|---|---|---|---|---|
| | | 1 | 2 | 3 | 4 | 5 | 6 | 1 | 2 |
| Process for purification | Thermosetting polyphenylene ether | PPE-A3 | PPE-B3 | PPE-C3 | PPE-D3 | PPE-E3 | PPE-F3 | PPE-W3 | PPE-Z3 |
| | Amount of toluene (g) | 500 | 500 | 500 | 500 | 500 | 500 | 500 | 1,000 |
| | Amount of water (g) | 15 | 20 | 25 | 400 | 300 | 400 | 200 | 400 |
| | Amount of ethanol (g) | 150 | 200 | 250 | — | — | — | — | — |
| | Amount of methanol (g) | — | — | — | 400 | 300 | 300 | 2,000 | 4,000 |
| | Total solvent consumption | 665 | 720 | 775 | 1300 | 1100 | 1200 | 2,700 | 5,400 |
| | ethanol:toluene | 0.3 | 0.4 | 0.5 | 0.8 | 0.6 | 0.8 | 4 | 4 |
| | Water:toluene | 0.03 | 0.04 | 0.05 | 0.8 | 0.6 | 0.6 | 0.4 | 0.4 |
| | Times of purification | 2 | 2 | 2 | 2 | 2 | 4 | 1 | 2 |
| | Weight fraction toluene | 0.75 | 0.69 | 0.65 | 0.38 | 0.45 | 0.42 | 0.19 | 0.19 |
| | Weight fraction ethanol | 0.23 | 0.28 | 0.32 | 0.31 | 0.275 | 0.25 | 0.74 | 0.74 |
| | Weight fraction water | 0.02 | 0.03 | 0.03 | 0.31 | 0.275 | 0.33 | 0.07 | 0.07 |
| | Molar fraction toluene | 0.57 | 0.50 | 0.44 | 0.14 | 0.17 | 0.15 | 0.07 | 0.07 |
| | Molar fraction ethanol | 0.34 | 0.40 | 0.44 | 0.31 | 0.30 | 0.25 | 0.79 | 0.79 |
| | Molar fraction water | 0.09 | 0.10 | 0.12 | 0.55 | 0.53 | 0.60 | 0.14 | 0.14 |
| | Location of Phase Diagram | Liquid-liquid-equilibria (LLE) Two phases liquid-liquid region | | | | | | Single-phase region | |
| Properties | Molecular weight of Mn | 3,860 | 18,983 | 2,675 | 2,749 | 19,256 | 17,780 | 2,753 | 19,975 |
| | OH value | N/D | 0.01 | N/D | N/D | 0.01 | N/D | N/D | N/D |
| | Content of chlorine (ppm) | 565 | 652 | 624 | 628 | 562 | 354 | 896 | 715 |

TABLE 1-continued properties of polyphenylene ether

|  | Example | | | | | | Comparative Example | |
| --- | --- | --- | --- | --- | --- | --- | --- | --- |
|  | 1 | 2 | 3 | 4 | 5 | 6 | 1 | 2 |
| Content of sodium (ppm) | 12 | 15 | 12 | 15 | 14 | 8 | 83 | 42 |
| Purity (%) | 99.4 or more | 99.5 or more | 99.5 or more | 99.6 or more | 99.6 or more | 99.9 or more | 95.9 | 97.2 |

Note:
PPE-A3: thermosetting polyphenylene ether having a low molecular weight (Mn) of 3,860, purified by liquid-liquid two phases of purification;
PPE-B3: thermosetting polyphenylene ether having a high molecular weight (Mn) of 18,983, purified by liquid-liquid two phases of purification;
PPE-C3: thermosetting polyphenylene ether having a low molecular weight (Mn) of 2,675, purified by liquid-liquid two phases of purification;
PPE-D3: thermosetting polyphenylene ether having a low molecular weight (Mn) of 2,749, purified by liquid-liquid two phases of purification;
PPE-E3: thermosetting polyphenylene ether having a high molecular weight (Mn) of 19,256, purified by liquid-liquid two phases of purification;
PPE-F3: thermosetting polyphenylene ether having a low molecular weight (Mn) of 17,780, purified by liquid-liquid two phases of purification;
PPE-W3: thermosetting polyphenylene ether having a low molecular weight (Mn) of 2,753, purified by single-phases of purification due to in excess of using methanol for one times;
PPE-Z3: thermosetting polyphenylene ether having a high molecular weight (Mn) of 19,975, purified by single-phases of purification due to in excess of using methanol for two times;

CONCLUSIONS

1. In Examples 1-6, the produced thermosetting polyphenylene ether resin all have their chlorinity and metal content reaching predetermined limits, which are chlorinity of smaller than 700 ppm and metal content of smaller than 20 ppm, respectively. On the contrary, those products of Comparative Examples 1-2 exceed the predetermined limits.
2. In Examples 1-6, the extraction liquid obtained after phase splitting was simply distilled and entirely added back to the extraction system, without adding new solvent. The repeated recycling can minimize solvent consumption, making the disclosed method environmentally friendly and energy conserving.
3. In Examples 1-6, the extraction liquid obtained after phase splitting can be recycled and reused through simple distillation. It is meant that the extraction liquid for solvent recycling is no required to frequent purification, the disclosed process for producing thermosetting polyphenylene ether resin therefore provides advantages about low equipment costs, low energy consumption, and environmental protection.
4. In Examples 1-6, the produced thermosetting polyphenylene ether resin all have a purity of greater than 99.4% respectively, better than those of Comparative Examples.

What is claimed is:

1. A process for producing modified thermosetting polyphenylene ether resin, without step of separating out polyphenylene ether resin into powder, comprising the following steps:
    a) dissolving a polyphenylene ether resin having a hydroxyl group in a good solvent selected from toluene solvent, xylene solvent, methyl isobutyl ketone (MIBK) solvent or butanone (MEK) solvent, heating to 65-85° C.;
    b) graft reaction for modification:
        b1) based on the total weight of the polyphenylene ether resin, adding 0.5%-5 wt % of a phase transfer catalyst to the good solvent after the resin is completely dissolved;
        b2) adding an aqueous solution containing alkali metal ion to allow the hydroxyl group of the polyphenylene ether resin to form terminal phenoxide;
        b3) dropwise adding a graft monomer in the presence of the phase transfer catalyst to perform graft modification reaction at 50-120° C.; and
        b4) setting the solution aside for reaction for 9-12 hours to obtain a modified thermosetting polyphenylene ether resin solution;
    c) performing water rinse to obtain a semi-finished product of a modified polyphenylene ether resin solution;
    d) performing extraction by adding a combination of an alcohol solvent and water as an extraction liquid into the modified polyphenylene ether resin solution, wherein alcohol solvent is selected from methanol, ethanol, propyl alcohol or butyl alcohol, to make sure to satisfy one of the following requirements:
        d1) a congruent point corresponding to those weight fractions of the good solvent, the alcohol solvent, and the water is located within a two phase liquid-liquid region of the good solvent—the alcohol solvent—water ternary phase diagram measured at 25-75° C. and 1-3 atmosphere; or,
        d2) a congruent point corresponding to those molar fractions of the good solvent, the alcohol solvent, and the water is located within a two phase liquid-liquid region of the good solvent—the alcohol solvent—water ternary phase diagram measured at 25-75° C. and 1-3 atmosphere;
    e) performing phase splitting to obtain the modified polyphenylene ether resin solution in a purified state; and
    f) drying the solution to obtain a final product of the modified polyphenylene ether resin having a purity of more than 99.4%.

2. The process as defined in claim 1, wherein the phase transfer catalyst of step b1) is one or more selected from the group consisting of tetraethylammonium bromide (TEAB), tetrabutylammonium bromide (TBAB), hexadecyl trimethyl ammonium bromide (HTAB) and tetrabutylammonium hydrogen sulfate (TBAHS).

3. The process as defined in claim 1, wherein the adding amount of the phase transfer catalyst is 0.5%-5% by weight of the polyphenylene ether resin of step a).

4. The process as defined in claim 1, wherein the aqueous solution containing alkali metal ion of step b2) is one or more selected from sodium hydroxide aqueous solution, potassium hydroxide aqueous solution, sodium carbonate aqueous solution, and potassium carbonate aqueous solution.

5. The process as defined in claim 1, wherein the adding amount of the aqueous solution containing alkali metal ion of step b2) is 1-2.5 times of the equivalent amount of the polyphenylene ether resin of step a).

6. The process as defined in claim 1, wherein the graft monomer of step b3) is one or more selected from the group consisting of 4-chloromethane styrene, 3-chloromethane styrene, acryloyl chloride, 3-bromo-1-propyne, 3-chloro-1-propyne, 3-chloro-propene, 3-bromo-propene, chloromethyl-benzene, 1-chloromethyl naphthalene, benzoyl chloride, naphthalene chloride, 4-ethynyl-benzoyl chloride, 4-ethynyl-benzoyl bromide, 4-ethynyl-2-fluoro-benzoyl chloride, 4-vinylbenzoyl chloride, benzoic anhydride and methacrylic anhydride.

7. The process as defined in claim 1, wherein the good solvent of step a) is a toluene solvent and the extraction liquid for performing extraction of step d) is a combination of a methanol solvent and water, and a congruent point corresponding to those weight fractions of toluene, methanol, and water is satisfied to a requirement of being located within a two phase liquid-liquid region of the toluene-methanol-water ternary phase diagram measured at 25-75° C. and 1-3 atmosphere.

8. The process as defined in claim 1, wherein the good solvent of step a) is a toluene solvent and the extraction liquid for performing extraction of step d) is a combination of an ethanol solvent and water, and a congruent point corresponding to those molar fractions of toluene, ethanol, and water is satisfied to a requirement of being located within a two phase liquid-liquid region of the toluene-ethanol-water ternary phase diagram measured at 25-75° C. and 1-3 atmosphere.

9. The process as defined in claim 1, wherein the modified polyphenylene ether resin of step f) has a chlorine content below 700 ppm and a metal content below 20 ppm.

* * * * *